US005411620A

United States Patent [19]

Hsu

[11] Patent Number: 5,411,620

[45] Date of Patent: May 2, 1995

[54] METHOD FOR ADHERING A LABEL ONTO A SURFACE OF AN OBJECT AND A FIXTURE THEREOF

[75] Inventor: Hung H. Hsu, Taoyuan, Taiwan, Prov. of China

[73] Assignee: Acer Peripherals, Inc., Taiwan, Taiwan, Prov. of China

[21] Appl. No.: 118,708

[22] Filed: Sep. 9, 1993

[51] Int. Cl.$^6$ .............................................. B32B 31/00

[52] U.S. Cl. .................................... 156/230; 156/299; 156/303.1

[58] Field of Search ................. 156/60, 230, 241, 297, 156/299, 303.1

[56] References Cited

U.S. PATENT DOCUMENTS 5,316,613 5/1994 Samuelson .......................... 156/234

*Primary Examiner*—Chester T. Barry

*Attorney, Agent, or Firm*—Robbins, Berliner & Carson

[57] ABSTRACT

A method and fixture for adhering a label onto a surface of an object. The fixture is a sheet body and has a hollow space in its central area for receiving the label to be adhered. The sheet body has at least a positioning structure for being accurately positioned on the nearby area of the location the label to be adhered.

4 Claims, 4 Drawing Sheets

METHOD FOR ADHERING A LABEL ONTO A SURFACE OF AN OBJECT AND A FIXTURE THEREOF

TECHNICAL FIELD OF THE INVENTION

The invention relates in general to a fixture and method for adhering a label onto a surface of an object and, in particular, relates to a fixture and method for adhering a label onto a surface of an electronic apparatus such as a monitor, a terminal or computer.

BACKGROUND OF THE INVENTION

Products sold in the market generally have a label, such as a trademark or a logo, adhered on their surfaces. If the products is sold by a manufacturer under the manufacturer's own brand, then a label is adhered on the surface of a product at the final stage of assembly and the finished product is packed and placed into a carton for shipment.

In some transactions, such as in an Original Equipment Manufacture (OEM) arrangement, products are shipped without any label. Instead, a label (typically containing the purchaser's own brand) is adhered onto a surface of the products by the purchaser. The reason for this process is because the purchaser of the products can sometimes make more profits selling the products under its more well known brand and through its marketing channels. Many sales and trading companies have been doing business in this approach for many years.

Some products, such as monitors, terminals, or computers with high precision mechanical and/or electrical parts, must be carefully packed to avoid damages due to shipment. If the product received by the purchaser have no labels and the purchaser intends to adhere its own label onto the product, the carton must first be unpacked and the product must be then taken out for adhesion of the label according to the conventional approach. At the completion of the above process, the product with label must then be placed in the carton and packed carefully again for further shipment to the downstream purchasers. The above process involves an unpacking and another packing procedures and it is time consuming and needs substantial human involvement. Furthermore, when the workers are adhering the label onto the surface of the goods, the label might be positioned inaccurately and which results in a misalignment of the label with respect to the product. The kind of defect might be a major concern to some critical consumers.

SUMMARY OF THE INVENTION

To the shortcomings of the conventional approach recited above, the present invention provides a fixture and method for adhering a label onto a surface of the goods. The invention allows the purchasers of the goods to adhere the label onto the precise location of the goods which improves the efficiency of the task and therefore reduces substantially the cost involved in the label adhesion process.

The fixture of the invention is a sheet body and has a hollow space on its central area for receiving the label to be adhered. The sheet body has at least a positioning structure for being accurately positioned on the nearby area of the location the label to be adhered.

The utility and characteristic of the invention may be further understood with the following recitation on the invention accompanied by the appended drawings.

DETAILED DESCRIPTION OF THE PRESENT INVENTION

Figure 1B:
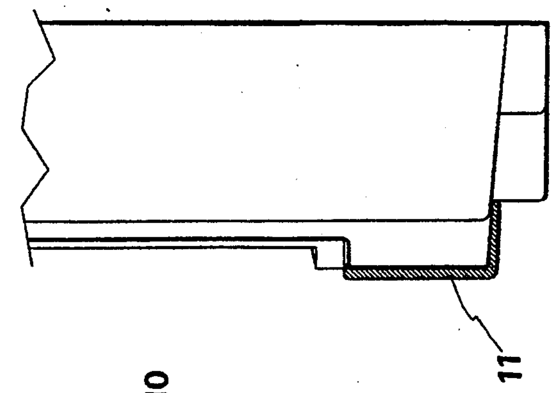
FIG. 1 shows a front view of a fixture, according to the invention, and the front view and the side view of the assembly when the fixture is positioned and engaged with a structure of a monitor.
Figure 1A:
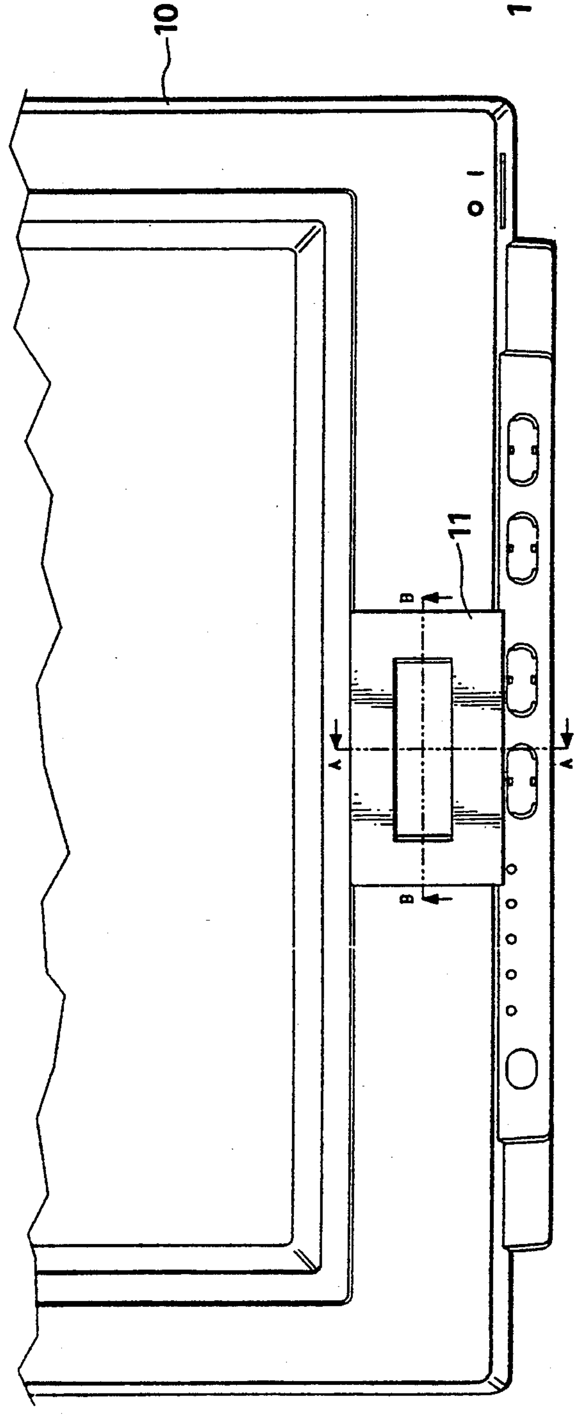
Figure 2:
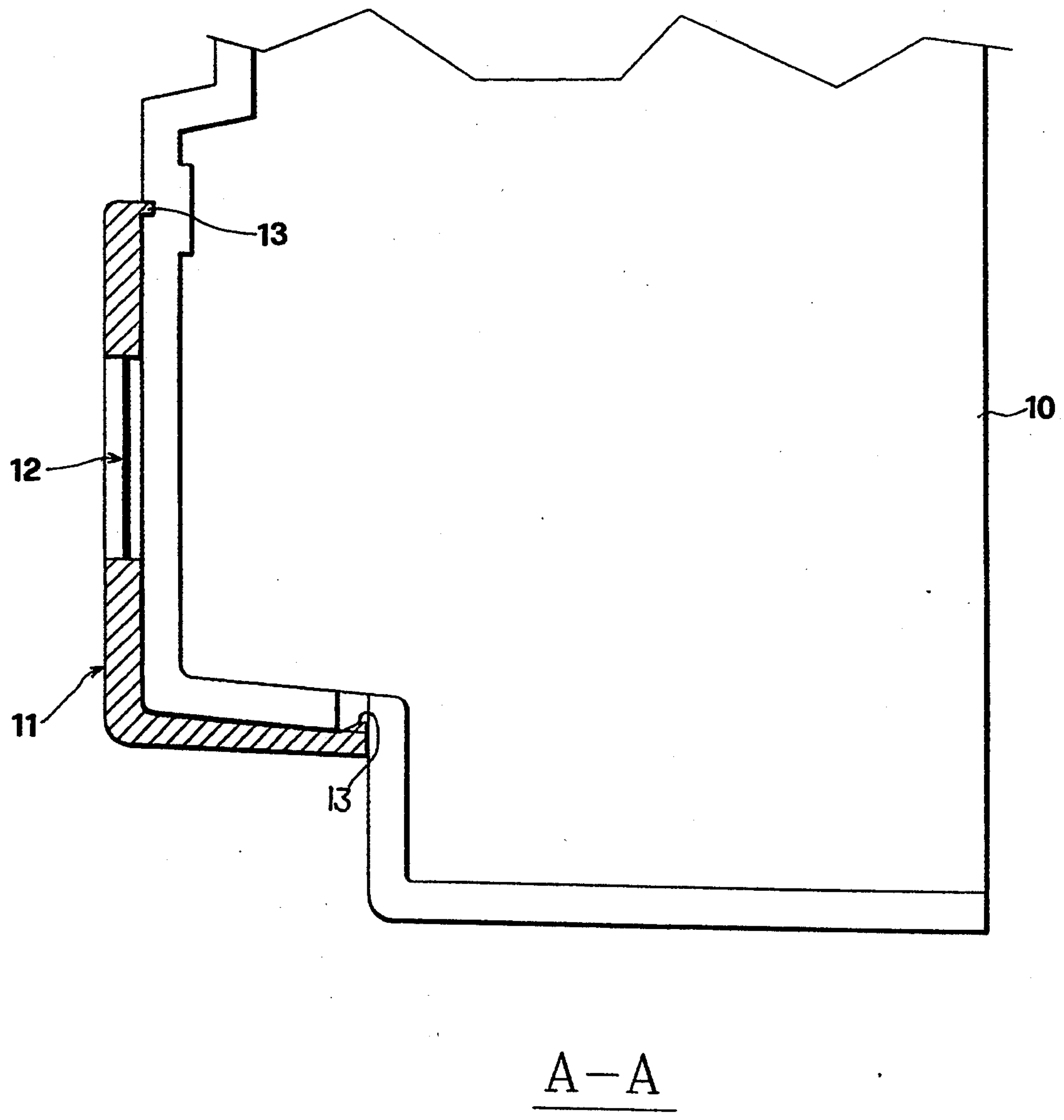
FIG. 2 shows the view of the section A—A in FIG. 1.

As shown in FIG. 1 and FIG. 2, the fixture 11 of the invention is a sheet body and has a hollow space substantially on its central area for receiving a label 12 to be adhered. The sheet body has at least a positioning structure 13 for accurately being positioned on a nearby area of the location the label to be adhered.

The shape of the hollow space may be a rectangular, as shown in FIG. 1, or other kind of shape, such as ellipse, depending on the shape of the label 12 to be adhered.

Figure 3A:
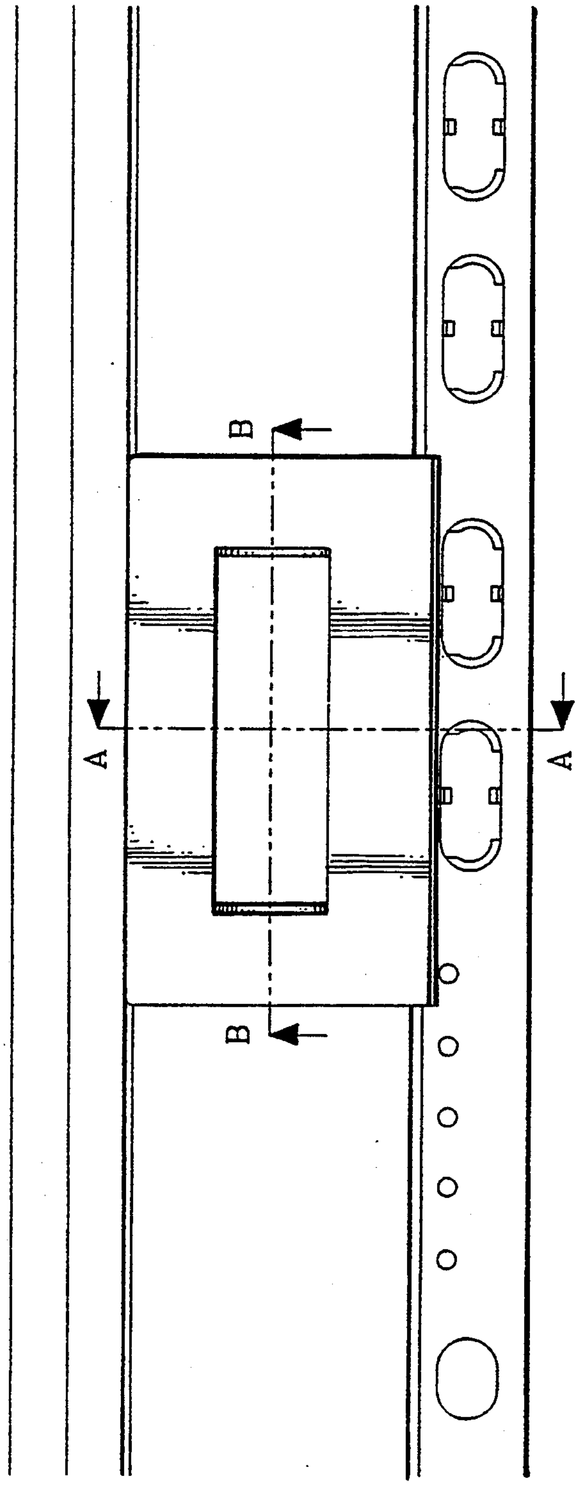
FIG. 3 shows the enlargement view of FIG. 1 and the view of the section B—B of FIG. 1.
Figure 3B:
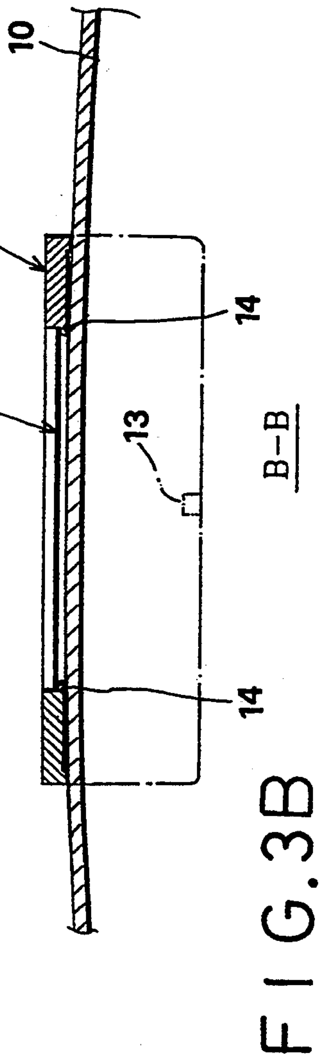

Referring to FIG. 2 and FIG. 3 which have the view of the section A—A and B—B of FIG. 1, the positioning structure 13 is a convex point for engaging with a corresponding cavity of the monitor 10.

However, as the positioning structure 13 is a rib, then a corresponding slot is required on the monitor 10 for the engagement with each other.

Accordingly, the positioning structure 13 may be a cavity or a slot, and a convex point or a rib then is required on the monitor 10 respectively for the engagement with each other.

Referring to FIG. 1 and FIG. 3, the fixture 11 has an inner rim formed on the circumference of the hollow space at least a rib 14 is extending from the inner rim for supporting and positioning the label 12 placed inside the hollow space.

A procedure is disclosed in the following for adhering the label 12 to the surface of an object.

At first, place the label 12 into the hollow space of the fixture 11. Then position the fixture 11 with the positioning structure of the surface of the object 10 as shown in FIG. 2 and 3. Afterwards, press the label 12 toward the surface of the object 10 such that the rear surface of the label 12, which has a glue material, is adhered on the surface of the object 10. Next step is to remove the fixture 11 from the positioning structure of the surface of the object 10 and the label 12 is therefore detached naturally from the fixture 11. The label 12 is as expected adhered to the surface of the object 10.

Figure 4:
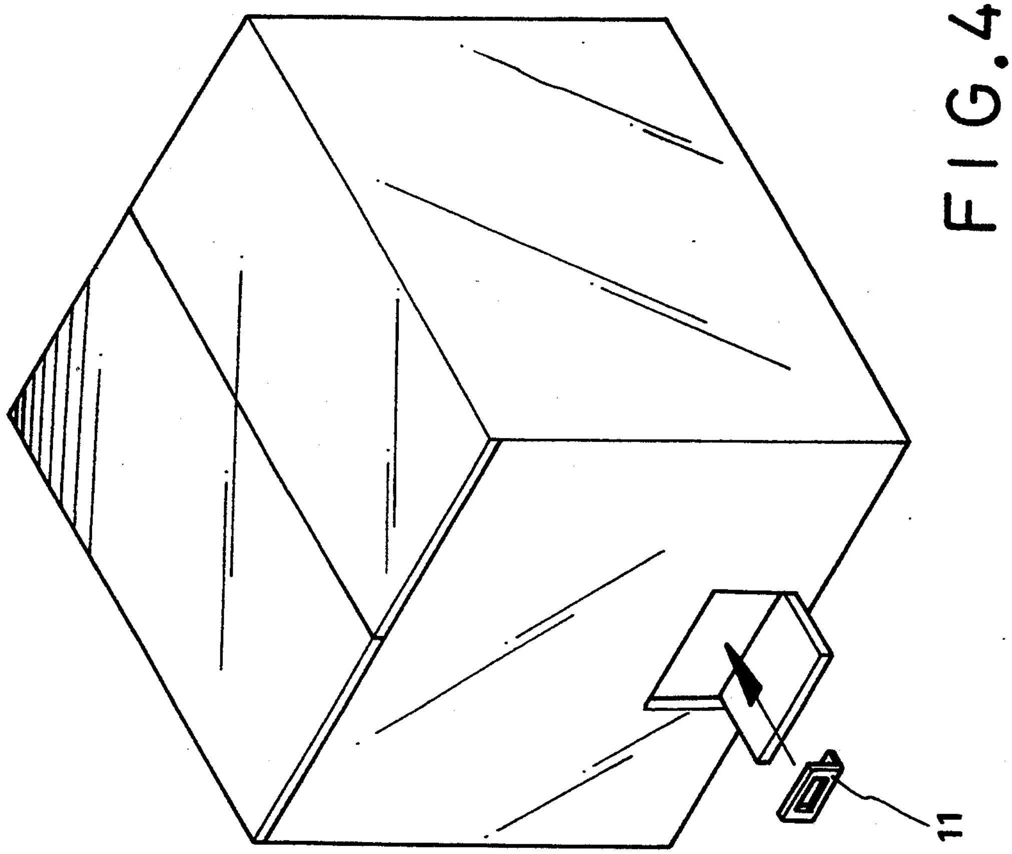
FIG. 4 shows the adhering procedure when the product is placed in a carton.

If the monitor 10 is placed and packed in a carton, as shown in FIG. 4, a movable window corresponding to the location of the positioning structure must be provided on the surface of the carton. The adhering procedures are as follow.

At first, place the label 12 into the hollow space of the fixture 11. Then open the window of the carton, and place the fixture 11 into the inside of the carton. At the same time position the fixture 11 with the positioning structure of the surface of the object 10. Afterwards, press the label 12 toward the surface of the object 10 such that the rear surface of the label 12, which has a glue material, is adhered on the surface of the object 10. Next step is to remove the fixture 11 from the positioning structure of the surface of the object 10 and take the fixture 11 out of the carton. The label 12 is therefore detached naturally from the fixture 11 and is as expected adhered to the surface of the object 10.

The monitor 10 has been used in the detailed description of the invention recited above for illustrative, rather than limiting, purpose. Therefore, the principle underlying the invention is applicable to any object which is adhereable, for example, the terminal, the computer, audio or other video equipment. Not only the above preferred embodiment of the invention, but the equivalence thereof are intended scope of the protection of the invention which is defined by the following claims.

What is claimed is:

1. A method for adhering a label accurately onto a predefined location of a surface of an object, the surface of the object having a first positioning structure for positioning a fixture, the fixture having a hollow space for receiving the label to be adhered, the method comprising the steps of:

(1) placing the label into the hollow space of the fixture which is provided with a second positioning structure;

(2) placing the fixture on the surface of the object to engage the second positioning structure of the fixture with the first positioning structure;

(3) pressing the label forward to the surface of the object to adhere the label to surface of the object;

(4) removing the fixture from the first positioning structure of the surface to detach the label from the fixture.

2. A method for adhering a label onto a surface of an object, the surface of the object having a positioning structure for positioning a fixture, the fixture having a hollow space for receiving the label to be adhered, the object being packed into a carton, the carton having an openable window corresponding to the location of the positioning structure, the method comprising:

(1) placing the label into the hollow space of the fixture;

(2) placing the fixture into the carton through the window and engaging the fixture with the positioning structure of the surface of the object;

(3) pressing the label toward the surface of the object such that the label is adhered on the surface of the object;

(4) removing the fixture from the positioning structure of the surface and the label being detached from the fixture.

3. The method as claimed in claim 1 or 2, wherein the object is a monitor.

4. The method as claimed in claim 1 or 2, wherein the object is a computer.

* * * * *